United States Patent
Blair et al.

(10) Patent No.: US 7,529,558 B1
(45) Date of Patent: May 5, 2009

(54) SYSTEM AND METHOD FOR LOCATION BASED PUSH-TO-TALK

(75) Inventors: Colin Blair, Westleigh (AU); Kevin Chan, Ryde (AU); Neil Hepworth, Artanmon (AU); Andrew Lang, Epping (AU)

(73) Assignee: Avaya Technology Corp., Basking Ridge, NJ (US)

( * ) Notice: Subject to any disclaimer, the term of this patent is extended or adjusted under 35 U.S.C. 154(b) by 647 days.

(21) Appl. No.: 11/248,926

(22) Filed: Oct. 11, 2005

(51) Int. Cl.
*H04B 7/00* (2006.01)

(52) U.S. Cl. .................... 455/519; 455/518; 455/456.1; 455/414.1

(58) Field of Classification Search ................ 455/515, 455/517, 518, 519, 520, 412.1, 415, 416, 455/456.1–3, 510, 514, 414.1, 417, 414.2
See application file for complete search history.

(56) References Cited

U.S. PATENT DOCUMENTS

2005/0143056 A1* 6/2005 Iyer et al. .................. 455/416
2006/0003740 A1* 1/2006 Munje ..................... 455/412.1
2006/0077969 A1* 4/2006 Trinkel et al. ............... 370/352
2006/0116149 A1* 6/2006 Dunn et al. ................. 455/518

* cited by examiner

*Primary Examiner*—John J Lee
(74) *Attorney, Agent, or Firm*—Sheridan Ross P.C.

(57) ABSTRACT

A system and method are provided for establishing location-based push-to-talk communication groups. A location determining application is incorporated within a communication network for members of a push-to-talk group. This application may include global positioning satellite technology incorporated in mobile communication devices carried by the members, a triangulation application incorporated at a communications server, or an RFID application associated with the members. Location data obtained on the members is maintained in a database that is accessible to a communications server facilitating communication between the members. When a member initiates a push-to-talk communication, other members of the group are contacted based upon their locations. The communication can be selectively transmitted to either those within a pre-designated location, or outside of the pre-designated location.

12 Claims, 4 Drawing Sheets

SYSTEM AND METHOD FOR LOCATION BASED PUSH-TO-TALK

FIELD OF THE INVENTION

The present invention relates to communication systems incorporating group contact or notification lists, and more particularly, to push-to-talk communications for a group of communicants wherein group contacts are determined by the physical locations of group members.

BACKGROUND OF THE INVENTION

Some communication networks may provide a user with the ability to simultaneously contact a group of individuals based upon a predetermined contact list that is established by the user. With respect to e-mail communications, a user can setup a list of predetermined contacts, and a message may then be distributed to each of those contacts designated by specifying the group in the distribution menu of the email. With respect to telephony networks, push-to-talk capability exists on some mobile phones. A user can setup predetermined contact lists with the service provider so that when the user activates a particular key on the mobile phone, all parties designated in the contact list are simultaneously contacted.

The use of contact lists or groups has become quite common; however, one inherent drawback with respect to use of a contact list is the inability to dynamically adjust the contact list based upon the likelihood that one or more of the members in the group will not be available to respond to the communication sent.

In some instances, it is desirable to contact only those individuals found at a particular geographic location because those individuals who are not at the location are not able to respond to the communication in a satisfactory manner. For example, in a hospital setting, it may be desirable to contact only selected hospital personnel who are on duty at the time in order to respond to a particular kind of medical emergency. In this example, it is highly desirable to simultaneously contact all available selected personnel within the geographic location so that response time to the emergency is shortened by the high probability that at least one of the personnel will respond to the inquiry. While separate calls could be made to the selected personnel, separate calls are time consuming and the locations of the personnel are not known until the calls are made. While conventional push to talk communications could be used, many personnel may not be on duty or may not be physically located at the hospital at the time.

It is also well known that conventional intercom/paging methods are not reliable because even if one or more members of the selected group are present, some may not respond because they do not hear the page due to background noise or other distractions. Additionally, some of the members may not be present at the geographical location. Therefore, a need has arisen for generating dynamic contact lists based upon the geographic location of the members of the contact lists.

SUMMARY OF THE INVENTION

The present invention is directed to solving these and other problems associated with communication contact lists that do not take into account the geographical locations of the members of the contact list. In accordance with the present invention, a system and method are provided for establishing location-based contact lists/groups that enable a communicant to selectively contact only those members of a particular list/group who are in a specified geographical location at the time in which the communicant desires to transmit a message. A mobile communication network is provided for communications between group members. Each member carries a mobile communication device such as a mobile phone or a personal digital assistant (PDA).

In accordance with one preferred embodiment of the present invention, a presence communication server maintains information on the locations of members of predetermined contact lists. The presence server maintains communications with one or more location identification systems that identify the location of each of the members. One method of identification is to incorporate radio frequency identification (RFID) for each group member. Each member carries an RFID tag/card that is read by one or more interrogating devices at the location of interest. The interrogating devices confirm the identity of each member carrying the tags/cards, and this information can then be transferred to the presence server such as by a wireless communication interface. As members arrive and depart the location of interest, the interrogation devices are able to track this movement, and the information transferred to the presence server allows the creation of dynamic groups based upon physical presence of members at the location of interest.

Another method of identifying member locations is to incorporate a global positioning satellite (GPS) function within the communication device carried by each of the members wherein the presence server continuously monitors the GPS data from each communication device.

Yet another method of identifying locations of members is to incorporate known triangulation techniques. So long as the members are within a geographical location serviced by the mobile phone carrier, triangulation can be used to track member locations.

Once member locations are tracked, the location information can then be transferred to a service provider server, such as a push-to-talk service provider server. The service provider server includes a group list database that is continually updated by information sent from the presence server. Alternatively, the service provider server may query the presence server in order to obtain the location data of the members. When a member selects the push-to-talk service and specifies a particular contact list, the service provider server retrieves the active group list, that is, the members who are in the specified geographical location. The call is then sent only to those members present at the specified location.

The members designated in a contact list can be determined by a user in a number of ways. One simple way to establish a contact list is for the user to simply generate a phone number/IP address listing for those desired to be within the contact list and forward that information to the service provider. Another method for establishing a contact list is through an e-mail server, such as a server running Microsoft Exchange®. For the e-mail server, the user may setup various contact lists and the e-mail server forwards that information to the mobile service provider. The user also designates the geographical area of interest corresponding to each contact list, and this information is updated and maintained at the service provider server.

In addition to specifying a dynamic contact list based upon the physical location of group members, a contact list can also be further defined by a pre-designated timeframe. Although members of a designated group may be at the location of interest, some of those members may not be the intended communicants if a communication is sent outside of a designated time period. During that designated time period, if a member of the contact list activates the push-to-talk service on the communication device, then all members in that group for the specified time period would be contacted. Thus, the present invention also contemplates dynamic group lists based upon physical location of members as well as time frames associated with the members. This time-based feature allows a user to further designate a targeted group for communications. One example application for a time-based push-to-talk group includes individuals who are scheduled to attend a meeting. The push-to-talk group would be activated for a predetermined time period (during the scheduled meeting), and would expire afterwards.

In accordance with another preferred embodiment of the present invention, a single server could be used to accommodate the location based push-to-talk functionality. Accordingly, the presence server and the push-to-talk service provider server could be incorporated within one master server.

Additional features and advantages of the present invention will become more apparent from the following discussion, particularly when taken together with the accompanying drawings.

DETAILED DESCRIPTION

Figure 1:
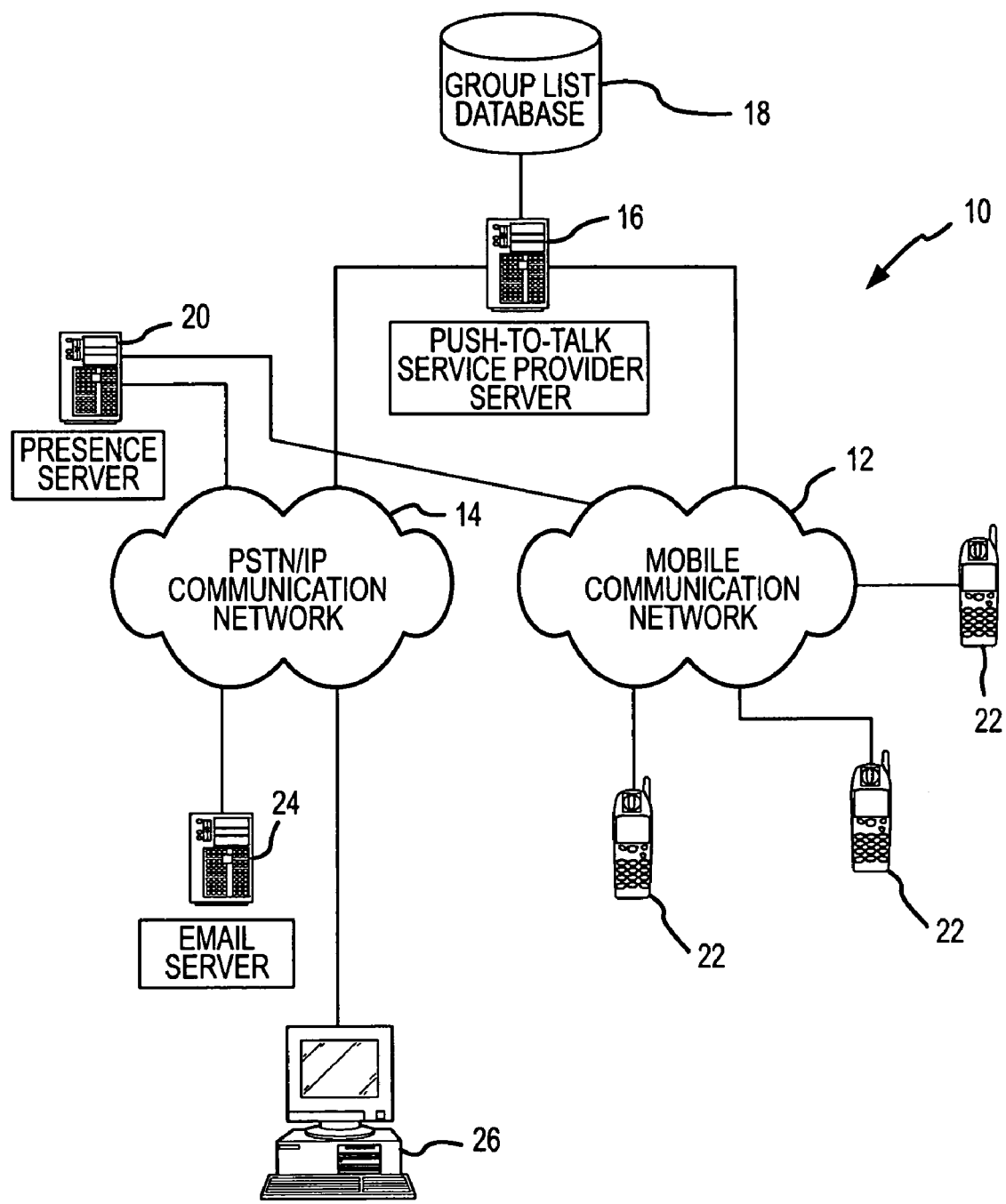
FIG. 1 is a schematic diagram depicting the present invention in a first embodiment.

FIG. 1 illustrates a communication system 10 that implements the location based push-to-talk functionality of the present invention in an exemplary communication system. The terms "push-to-talk" (PTT) generally refer to a method of communication utilizing half-duplex communication lines, including two-way radios. Activation of a single key/control on a user's communication device allows the user to send voice communications to a number of addressed communication end points. Releasing the key/control allows the voice communications to be received. PTT technology is today most commonly incorporated within mobile/cellular phone networks, thereby allowing the phones to function as digital two-way radios. Generally, only one person at a time can talk by pressing the PTT key/button, while the other addressed communication end points can listen. Some examples of specific PTT networks include 2.5 G packet switched networks using session initiation protocol (SIP) and real-time transport protocol (RTP). These particular protocols are often referred to as "push-to-talk over cellular" (PoC). It shall be understood that PTT as used herein shall refer to any communication protocol wherein activation of a control on a communication device results in simultaneous broadcast to multiple communication end points.

As shown in FIG. 1, a mobile communication network 12 is provided, as well as a PSTN/IP network 14. It shall be understood that the network 14 may comprise one or more networks of various types. For example, the network may comprise a public switch telephone network (PSTN) and/or a packet data network over which voice communications are transmitted in accordance with voice over Internet protocol (VoIP). It shall also be understood that networks 12 and 14 can be considered as one or more interconnected communication networks, the mobile communication network 12 indicating specific capability with respect to mobile communication devices 22 as communication end points.

FIG. 1 also illustrates two servers or processors that facilitate the functioning of the PTT functionality. Specifically, a PTT service provider server 16 is provided along with a presence server 20. The presence server 20 communicates with the communication devices 22 to retrieve location information on the locations of each of the members in each contact group/list. This location data is then sent to the service provider server 16. The service provider server 16 receives the location information and updates the listing of available members in each group/list by maintaining one or more group list databases 18. In the embodiment of FIG. 1, conventional mobile communication devices 22 are illustrated, and these communication end points are representative of wireless voice communication devices. FIG. 1 also illustrates a VoIP telephone 26 utilizing the Internet/IP network. When a user of a communication device 22/26 selects the PTT service, the service provider server retrieves from the group list database 18 the active members of the designated contact list (those members who are located in the geographical area of interest), and then activates the PTT service for the active members.

In some circumstances, the initiator of the push-to-talk communication may not be physically present at the location of interest. For example, if a meeting has been scheduled and the initiator of the push-to-talk communication is running late to the meeting, the initiator may wish to inform those at the meeting of the late status. Therefore, it is contemplated within the present invention that the initiator of the push-to-talk communication may not be required to be within the location of interest in order to transmit the communication to active group members.

In one aspect of the invention as discussed above, the active members of a contact list can be based upon those members that are found within a particular geographic area. In another aspect of the present invention, the active members of the group list can be defined as those who are not within the geographical area at the time. For example, if it were necessary to call off-duty workers back to a particular jobsite, the geographical area of interest for the contact list would be defined as the area outside of the jobsite. Accordingly, the dynamic contact list would be based upon those members of the group that were not located at the area of interest, and the active members would ultimately be determined by retrieving information from the group database for those members not found in the area of interest.

As mentioned above, an additional factor that may be considered in determining the dynamic contact list is to place a time constraint on the group listing. Accordingly, when a user sets up a group contact list, the user could also designate a specified time period in which it was desired to contact members of the group listing. For example, one may wish to conduct a telephonic meeting with a designated group during a certain time period. However, in this example, it is not desirable to contact the same group after expiration of the time period, the assumption being that the meeting should have ended and perhaps another meeting is scheduled shortly after the time period for some members of the group.

FIG. 1 also illustrates an e-mail server 24. Through the e-mail server, one could designate group listings and time constraints, and this information would be transferred to the service provider server 16 for defining the contact listings.

Figure 2:
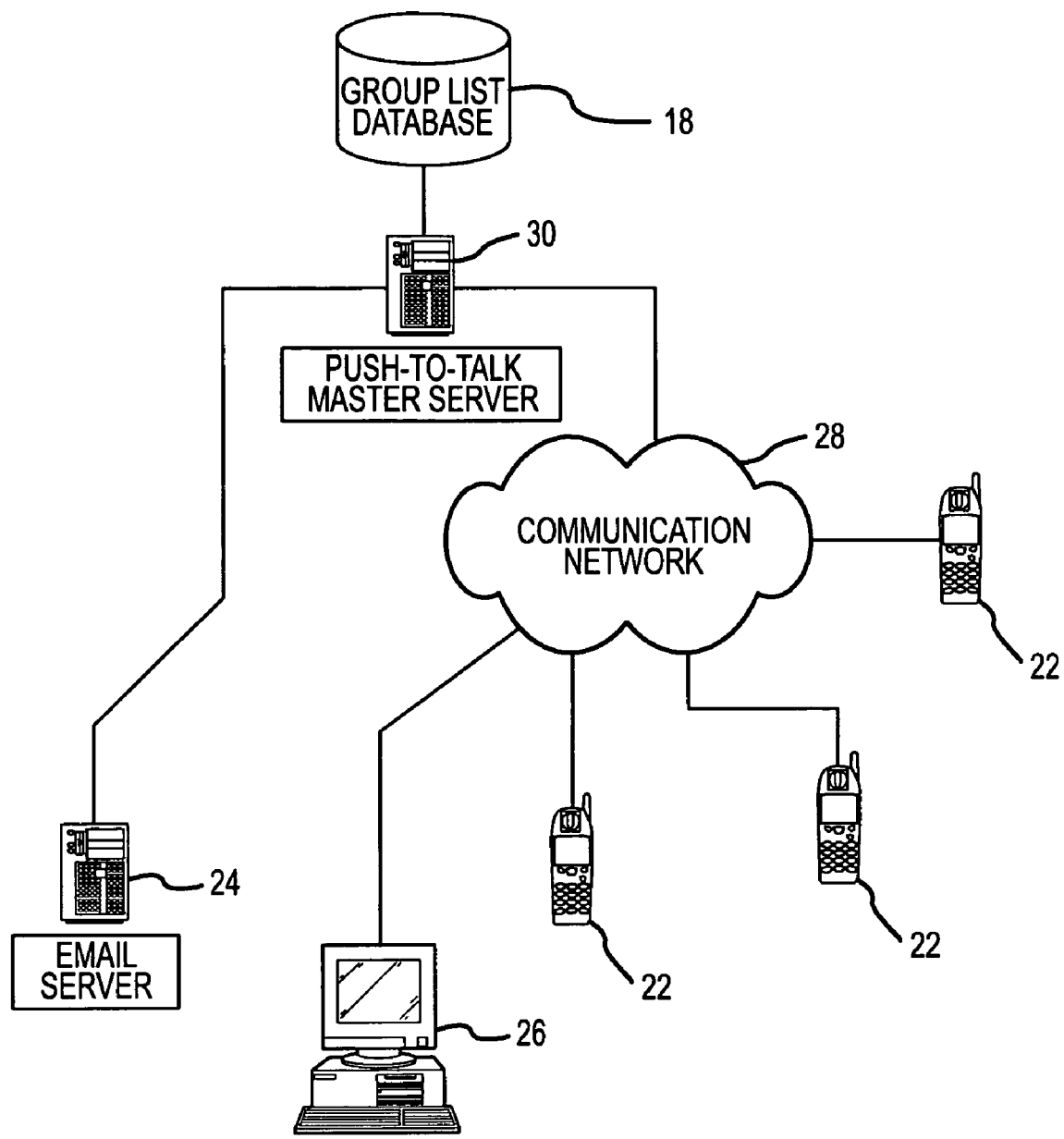
FIG. 2 is a schematic diagram depicting the present invention in a second embodiment.

Referring to FIG. 2, another embodiment of the present invention is illustrated with respect to an exemplary communication system. Specifically, the functionality achieved by the present invention is illustrated as being incorporated within a single server, shown as the PTT master server 30. A communication network 28 is also illustrated, and may comprise one or more networks to include a PSTN, an Internet/IP network, or a mobile communication network. Thus, instead of providing two separate servers as shown in FIG. 1, one master server is used to retrieve both location information and to maintain and update active group members within the group list database 18.

As understood by those skilled in the art, each of the servers described herein can generally be described as having a processor, memory, a communication network interface, and data storage in the form of one or more databases and/or one or more software/firmware applications. The software/firmware applications may include a specific communication application and another application that achieves the functionality of the present invention to include receiving and logging location data and administering the PTT functions on selected group members based upon preestablished criteria for each group. In addition, operating system programming may be stored in the data storage, as well as any other applications or data that are stored as part of the particular server.

Figure 3:
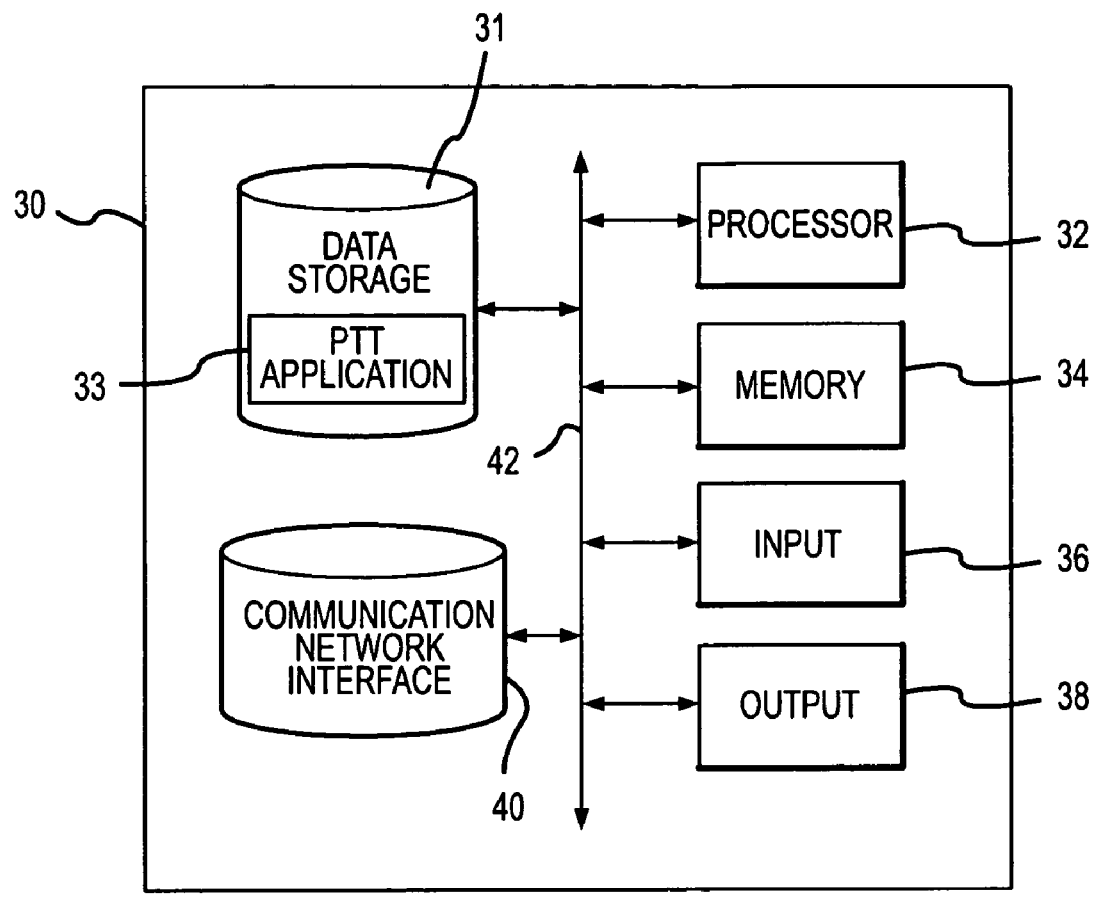
FIG. 3 is a schematic diagram depicting basic elements of the master server of FIG. 2.

With respect to the master server 30, FIG. 3 illustrates basic elements of this server. The server 30 can be described as generally including a processor 32, memory 34, an input device 36, an output device 38, a communication network interface 40, and data storage 31 in the form of one or more databases and/or one or more software/firmware applications. The specific functionality of the present invention in terms of executable programming instructions is depicted as the PTT application 33 in the data storage 31. The type of data storage may include magnetic storage devices, solid-state storage devices, optical storage devices, logic circuits, or any combination of such devices. Additionally, it should be appreciated that the programs and data can comprise hard-wired logic in addition to software/firmware. A communications bus 42 enables communication between the various components. The processor 32 may include any general-purpose programmable processor or controller for executing application programming, logic or instructions. Alternatively, the processor may comprise a specifically configured application-specific integrated circuit (ASIC). The processor 32 generally functions to run programming code implementing various other functions performed and/or implemented by the server 30, to include data location information gathering, posting of location data to the established contact lists, and activation of selected communication end points. The memory 34 is provided for use in connection with the execution of the programming, and for the temporary or long-term storage of data or programming instructions. The memory 34 may comprise solid-state memory, such as DRAM and SDRAM. Where the processor 32 comprises a controller, the memory 34 may be integral to the processor. The server 30 may incorporate one or more input devices 36 and one or more output devices 38. Examples of input devices include an alpha numeric keypad, a keyboard or pointing device. Examples of output devices 38 include a visual display appearing on a communication device, a text message, etc. The communication network interface 40 is provided for interconnecting the server 30 to the communication network 28. For example, the communication network interface 40 may comprise an Ethernet interface. The particular type of communication network to which the communication server 30 is interconnected generally determines the communication network interface.

Figure 4:
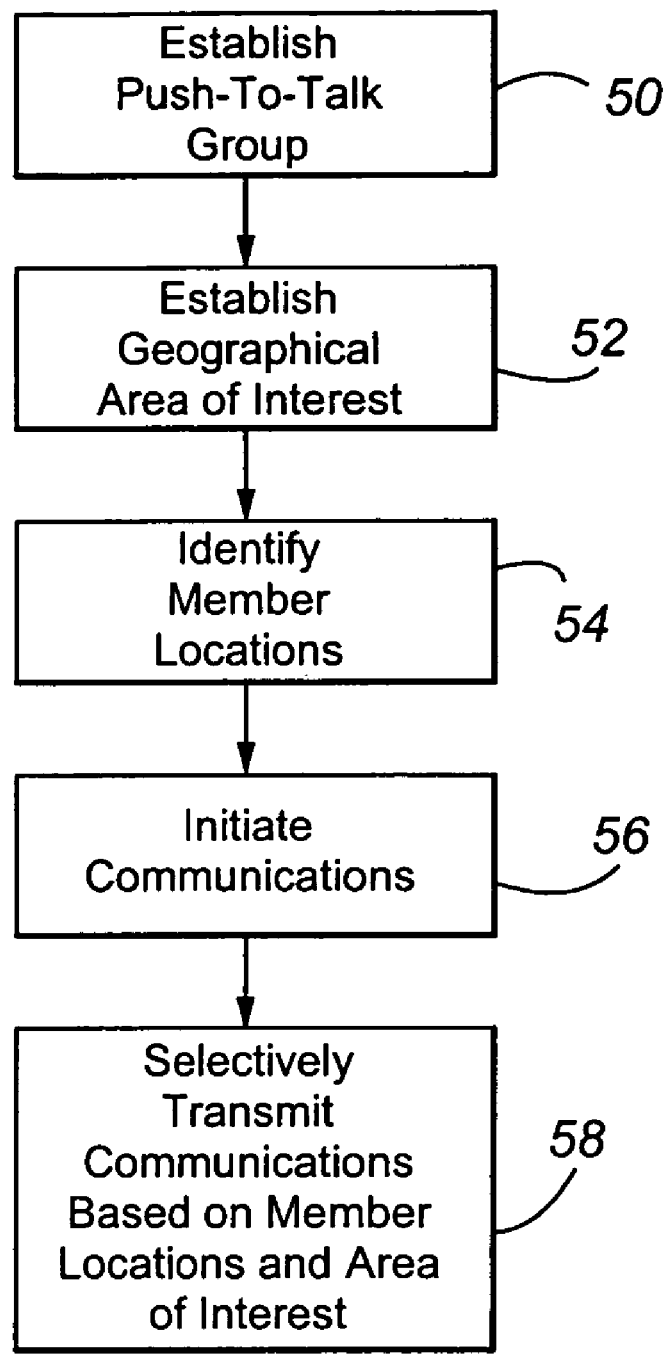
FIG. 4 is a flow diagram depicting a description of the method of the present invention.

Referring now to FIG. 4, a simplified flow diagram is presented to illustrate the method of the present invention. As shown at block 50, a push-to-talk group is established by identifying members of the group and their corresponding telephone numbers/IP addresses. At block 52, the geographical location/area of interest is established and is matched to the appropriate push-to-talk group. At block 54, the locations of the members are determined. As mentioned above, this location identifying step can be achieved by, for example, incorporation of a global positioning satellite application, a triangulation application, and/or an RFID application. At block 56, a group member initiates a communication to contact other members of the group. At block 58, the communication is transmitted to those members of the group based on the selected area of interest and the location of the group members with respect to the area of interest.

Although the present invention has been illustrated with respect to preferred embodiments thereof, it shall be understood that various other changes and modifications can be made to the present invention within the scope of the claims appended hereto.

What is claimed is:

1. A method of conducting communications, said method comprising:
    establishing a push-to-talk group comprising a plurality of members, each member having a communication device for communicating through a communication network;
    providing means for identifying locations of said members;
    initiating a first push-to-talk communication by one member directed to the other members of the group;
    determining the locations of the members at the time of the first communication;
    selectively transmitting the first communication only to members that are presently located within a pre-designated location; and
    establishing a time period for conducting communications between members of the push-to-talk group, wherein expiration of the time period corresponds to termination of the group defined for receiving the push-to-talk communications.

2. A method, as claimed in claim 1, wherein:
    said means for identifying includes at least one of (i) a global positioning satellite application incorporated in said communication devices, (ii) a triangulation application incorporated at a communications server for tracking locations of the communication devices, and (iii) an RFID application incorporated at the pre-designated location.

3. A method, as claimed in claim 1, wherein:
    the members of said group are selectively chosen by at least one member of the group, and said pre-designated location is selected by at least one member of the group.

4. A method, as claimed in claim 1, further comprising the step of:
    initiating a second push-to-talk communication by one member of the push-to-talk group, wherein those members receiving the second communication differ from the members receiving the first communication based on changed locations of the members.

5. A method of conducting communications, said method comprising:
    establishing a push-to-talk group comprising a plurality of members, each member having a communication device for communicating through a communication network;
    providing means for identifying locations of said members;
    initiating a first push-to-talk communication by one member directed to the other members of the group;

determining the locations of the members at the time of the first communication;

transmitting the first communication only to those members not within a pre-designated location; and wherein said means for identifying includes at least one of a triangulation application incorporated at a communications server for tracking locations of the communication devices and an RFID application incorporated at the pre-designated location.

6. A method, as claimed in claim 5, wherein:

the members of said group are selectively chosen by at least one member of the group, and said pre-designated location is selected by at least one member of the group.

7. A method, as claimed in claim 5, further comprising the step of:

initiating a second push-to-talk communication by one member of the push-to-talk group, wherein those members receiving the second communication differ from the members receiving the first communication based on changed locations of the members.

8. A method, as claimed in claim 5, further comprising the step of:

establishing a time period for conducting communications between members of the push-to-talk group, wherein expiration of the time period corresponds to termination of the group defined for receiving the push-to-talk communications.

9. A method, as claimed in claim 5, wherein:

an RFID application incorporated at the pre-designated location further comprises each member carrying an RFID tag/card that is read by one or more interrogating devices at a location of interest, the interrogating devices confirming the identity of each member carrying the tag/cards, and said information being transferred to a presence server such as by a wireless communication interface.

10. An apparatus for facilitating communications between members of a push-to-talk group communicating through a communications network, said apparatus comprising:

a communication server including a processor and a communications interface for communicating with a plurality of communication devices carried by the members;

programming instructions executed by said processor, said programming instructions including means for establishing active members of the push-to-talk group based upon geographic locations of the members;

a location determining application communicating with said processor for providing data inputs reflective of member locations;

a time period application for establishing a time period for conducting communications between members, wherein expiration of the time period corresponds to termination of the group defined for receiving the communications; and wherein a push-to-talk communication initiated by a member to other members is selectively transmitted only to those other members that are presently located at a pre-designated location.

11. An apparatus, as claimed in claim 10, further including:

an e-mail server communicating with said processor for establishing members of the push-to-talk group by identifying IP addresses/phone numbers of the members.

12. An apparatus, as claimed in claim 10, wherein:

said location determining application includes at least one of (i) a global positioning satellite application incorporated in said communication devices, (ii) a triangulation application incorporated at the communications server for tracking locations of the communication devices, and (iii) an RFID application incorporated at the pre-designated location.

* * * * *